Oct. 6, 1931.  I. W. ROSS ET AL  1,826,526

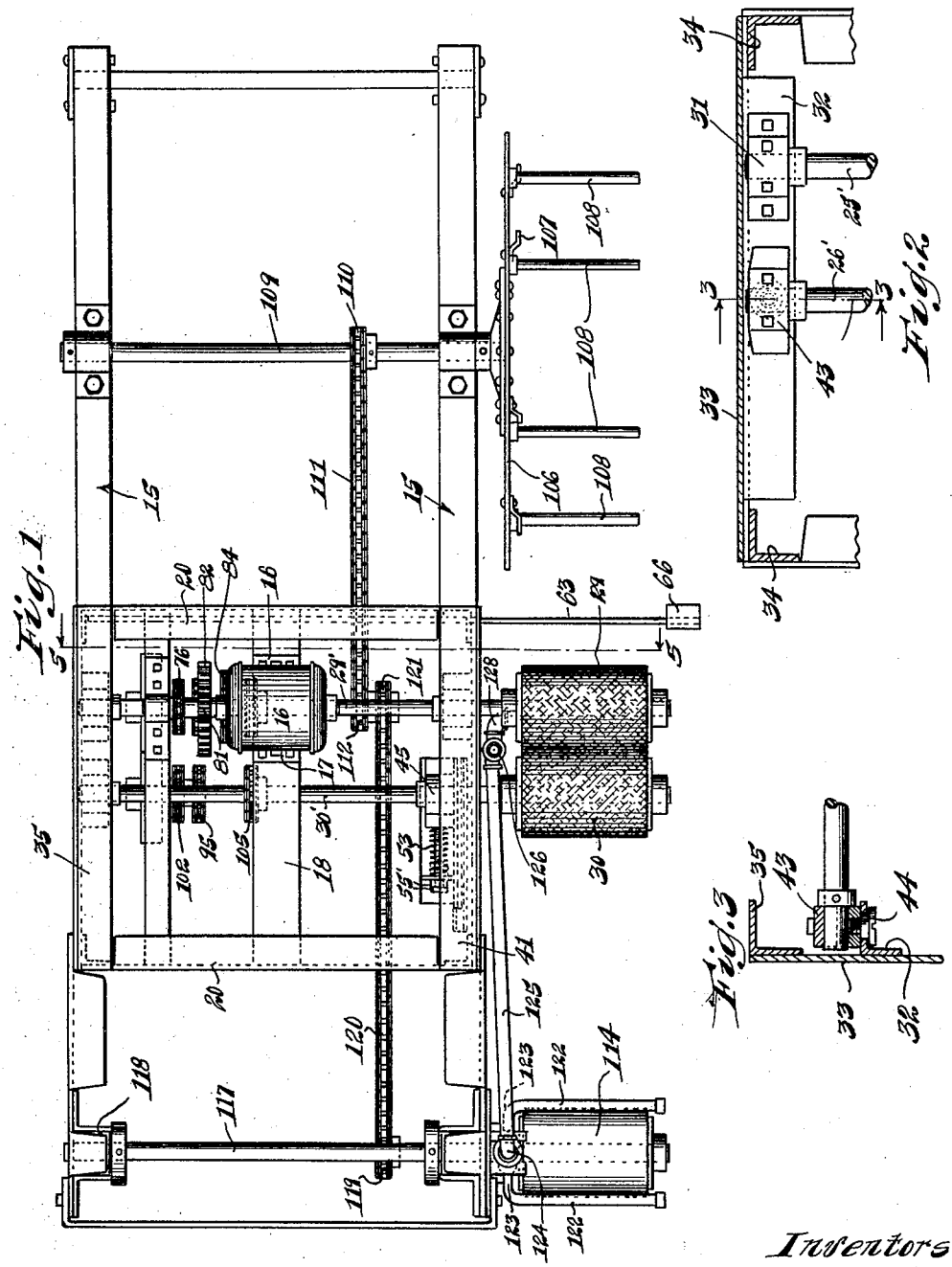

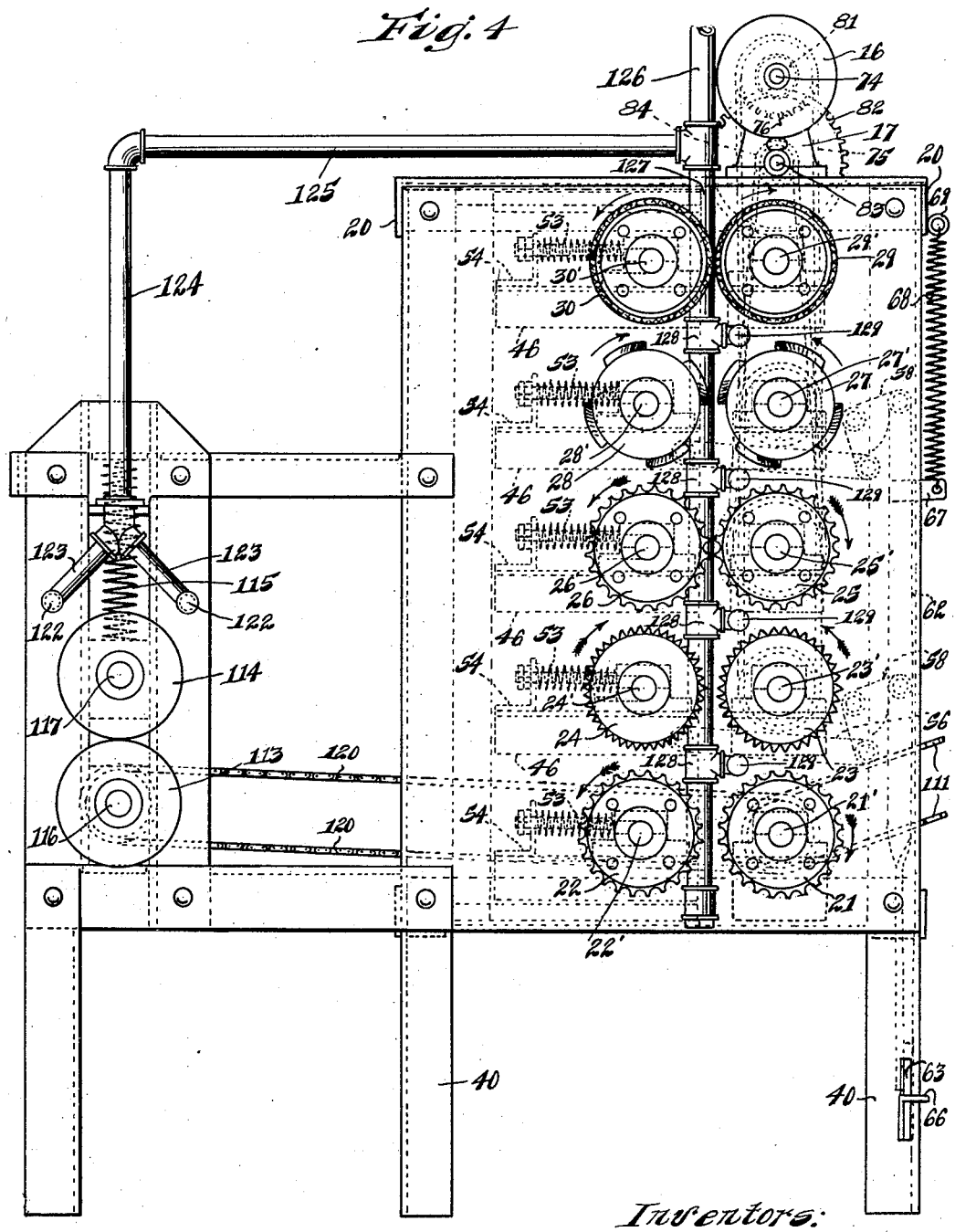

STRIPPING MACHINE

Filed Oct. 14, 1929    5 Sheets-Sheet 3

Fig. 5

Inventors.
Irving William Ross,
And Joseph G. Krob,
By Joshua R. H. Potts
their Attorney.

Witnesses:
C. E. Wessels
A. E. Matsen

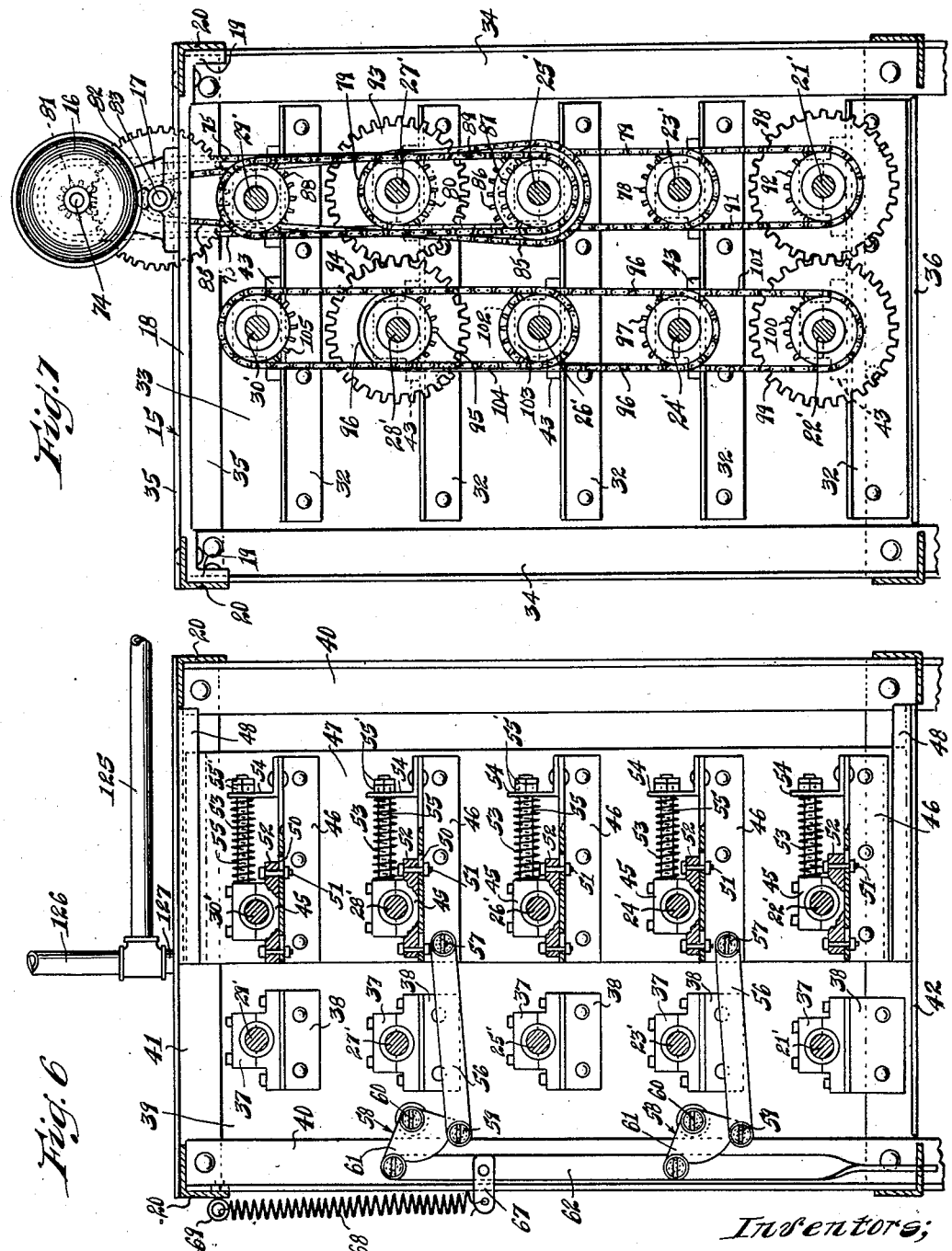

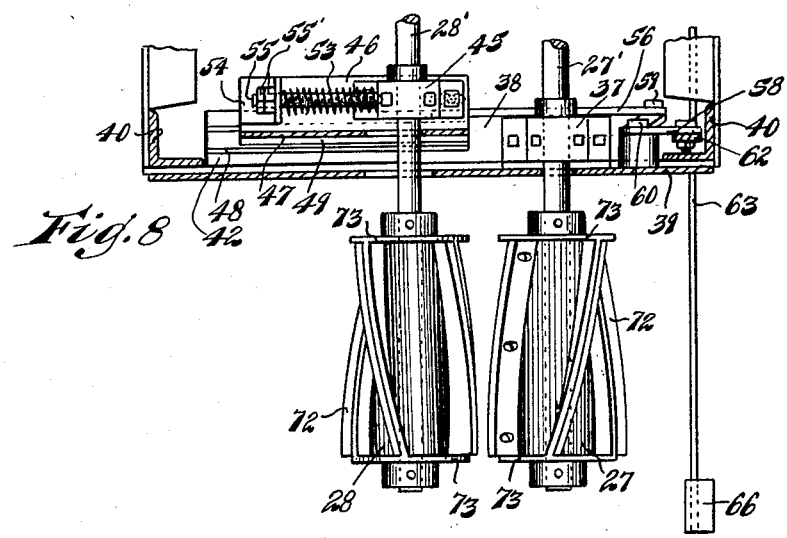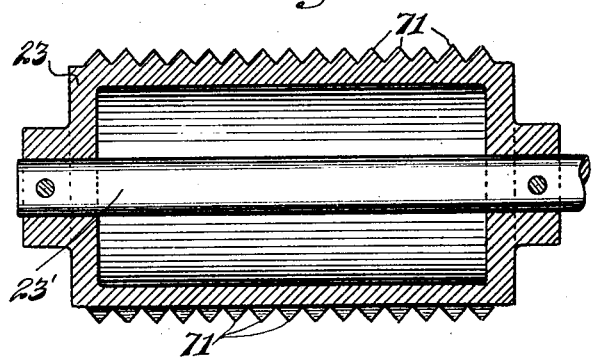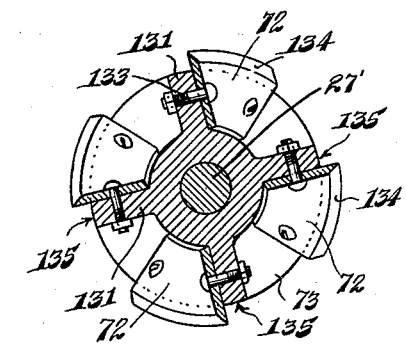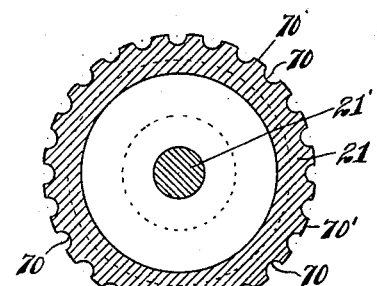

Patented Oct. 6, 1931

1,826,526

UNITED STATES PATENT OFFICE

IRVING W. ROSS AND JOSEPH S. KROB, OF CHICAGO, ILLINOIS, ASSIGNORS OF ONE-HALF TO IRVING W. ROSS AND ONE-HALF TO JOSEPH S. KROB, BOTH OF CHICAGO, ILLINOIS

STRIPPING MACHINE

Application filed October 14, 1929. Serial No. 399,434.

This invention relates to stripping machines, and more particularly to machines for defatting animal intestines when preparing them to be used for sausage casings.

In cleaning and preparing intestines to be used for sausage casings it is necessary to remove the fat and external substance, and this must be done without damaging the tube. This defatting is usually done by hand and requires considerable skill on the part of the operator in order not to cut through the skin. Furthermore, the process is comparatively slow and expensive. Machinery has been devised with a view of accomplishing this work, said machines being designed to operate either semi-automatically or entirely automatically, but these have not proven to be as successful or advantageous to the desired extent.

The present invention has for its objects to produce a simple and practical machine which will operate with a high degree of efficiency in stripping the fatty substance from animal intestines, and more particularly bovine or beef intestines which, owing to their nature, have been found most difficult to treat in the ordinary way. Other objects and advantages to be obtained will hereinafter more fully appear.

The invention consists in the general construction of the machine and in the several parts and combinations and arrangements of parts as hereinafter described and pointed out with particularity in the appended claims.

In the accompanying drawings, forming part of this specification, and illustrating a practical adaptation of the invention,—

Fig. 1 is a top plan view of the machine;

Fig. 2 is a fragmentary view, partly in horizontal section and partly in top plan, illustrating the correlation of the fixed and the oscillatory shaft bearings;

Fig. 3 is a section taken on or about the line 3—3 of Fig. 2;

Fig. 4 is a front elevation of the major portion of the machine;

Fig. 5 is a vertical section, taken on or about the line 5—5 of Fig. 1;

Fig. 6 is a section taken on or about the line 6—6 of Fig. 5;

Fig. 7 is a section taken on or about the line 7—7 of Fig. 5;

Fig. 8 is a fragmentary view showing the details of the cooperating pair of rotary knives;

Fig. 9 is a cross-section through one of the preliminary stripping rolls;

Fig. 10 is a longitudinal section on the line 10—10 of Fig. 9;

Fig. 11 is a cross-section through one of the rotary cutters; and

Fig. 12 is a cross-section through one of the preliminary feed rolls.

Referring now to the drawings, the numeral 15 indicates generally the frame of the machine, which, in practice, is preferably constructed of commercial angle and channel iron sections. Preferably, the machine is directly motor-driven, the motor being designated by the numeral 16, and, as shown, having a base portion 17 which is mounted on a longitudinally extending frame member 18, said member 18 having annular end portions 19 which are riveted or bolted to transverse angle members 20 at the top of the main body frame. The motor 16 is geared or belted in a manner hereinafter more fully described to the respective drive shafts which actuate the several rotary elements, to be presently described, in the treatment for which the machine is primarily intended.

Generally stated, the machine comprises a coacting pair of primary feeding rollers 21 and 22, located in the lower portion of the machine, above which work a pair of stripping rolls 23 and 24 of a peculiar character. Working above the stripping rolls is a pair of secondary feeding rollers 25 and 26, preferably similar to the rollers 21 and 22, while above said secondary feeding rollers is a pair of cooperating rotary cutting elements 27 and 28. Above said cutting elements is a pair of feeding rollers 29 and 30, between which the intestines are passed after being acted upon by the hereinbefore mentioned elements.

One of the elements 21, 23, 25, 27 and 29, respectively, of each of the just hereinbefore described cooperating pairs, is mounted on a shaft which is rotatable about a fixed axis, while the companion members of the several pairs, namely, the elements 22, 24, 26, 28 and 30, are respectively mounted on shafts which are rotatable about axes which are oscillatory in a horizontal plane, whereby the respective elements may be moved toward and from their respective companion elements. To this end, the shafts 21', 23', 25', 27' and 29' have their rear end portions journaled in bearings 31, said bearings being fixedly mounted on angle brackets 32 which are secured to the inner face of a rectangular plate 33, which latter is secured to the vertical frame members 34 and horizontal upper and lower frame members 35 and 36, respectively, of the main body frame. The shafts are also journaled near their outer end portions in bearings 37, said bearings being fixedly mounted on angle brackets 38 secured to the inner face of a front plate 39, similar to the plate 33, said plate 39 being secured to the vertical frame members 40 and upper and lower frame members 41 and 42, respectively. The respective shafts 21', 23', 25', 27' and 29' are projected through openings provided therefor in said plate 39 and have the respective elements 21, 23, 25, 27 and 29 fastened thereon, preferably by set screws, removable pins, or the like, whereby they may be readily removed at will.

The respective shafts 22', 24', 26', 28' and 30' for the several elements 22, 24, 26, 28 and 30 are journaled at their inner ends in bearings 43 which are swiveled to turn about a vertical axis on the respective horizontal bracket members 32. The manner of mounting each bearing 43 is best illustrated in Fig. 3 of the drawings, it being pivotally secured on the horizontal flange of the angle bracket member 32 by a shouldered stud 44. The respective shafts 22', 24', 26', 28' and 30' are journaled near their forward ends in bearings 45, said bearings being slidably supported on angle bracket members 46, which latter are secured on the inner face of a supplemental front plate 47. This supplemental plate 47 is slidably fitted at its upper and lower ends in channeled guide members 48 which are secured to the horizontal flanges of the upper and lower frame members 41 and 42, respectively, said slidable plate 47 being reinforced at its upper and lower margins by strips 49. The bearings 45 have a slot and bolt connection with the bracket member 46, the slots 50, as shown, being provided in the horizontal flanges of said members 46 and the bolts 51 being mounted in apertures provided therefor in the oppositely flanged portions 52 of said bearings 45. The bearings 45 are yieldably held in a normally forward position, or in a direction towards the opposed companion shaft by a spring 53 which bears at one end against said bearing and at its opposite end against an abutment afforded by an angle member 54 which is fastened on top of the horizontal flange of said bracket member 46. The forward movement of the respective bearing members 45 is ordinarily limited by the bolts 51 which engage the ends of the slots 50, but to provide for an adjustment of said bearing members it is preferable to attach one end of a rod 55 to the bearing block and extend said rod slidably through an aperture provided therefor in said abutment member 54 and provide said rod with an adjustable collar or shoulder 55' which may be screw-threaded onto the rod so as to engage the flange of the abutment member 54.

The supplemental slidable plate 47 has one end portion of a pair of links 56 attached thereto, as at 57, said links 56 being attached at their opposite ends to bell crank members 58, as at 59, and said bell crank members being pivoted, as at 60, on the inner face of the front plate 39. The opposite arms 61 of said bell crank members 58 are attached to a vertical reciprocatory operating rod or bar 62, said rod or bar being pivotally attached at its lower end portion to a pedal lever 63, as at 64, said lever 63 being pivoted to one of the rear vertical frame members 34, as at 65, and having a treadle member 66 at its outer end. The bar 62 is provided with a lateral extension 67, said extension 67 having one end portion of a spring 68 attached thereto, the opposite end of said spring being attached to an eye 69 or other suitable supporting member provided therefor on an upper frame member. By this arrangement the spring 68 yieldably holds the rod 62 in a normal upper position, and through the connections of the bell crank members 58 and links 56 the supplemental slidable plate 47 is accordingly held in a normal forward position with the respective rollers of the several cooperating pairs in their normal working relation to each other.

The primary and secondary feeding rollers 21, 22 and 25, 26, respectively, are preferably corrugated longitudinally, as at 70, the grooves being preferably rounded in cross-section and the peripheral faces 70' of the longitudinal ribs afforded by such corrugation being relatively wide.

The stripping rolls 23 and 24 have a multiplicity of substantially pyramidal peripheral teeth 71 which are formed by grooving the rolls longitudinally with a V-shaped cut so as to produce correspondingly sharp edged ribs, and then annularly grooving the rolls in the same manner, thereby cross-cutting the ribs.

The rotary cutting elements 27 and 28, which are preferably made in cooperative right and left arrangement, are provided with spirally arranged, or, at least, substantially spirally arranged cutting blades 72, said blades being preferably connected at their ends to annular circumferential flanges 73, which afford pockets so as to confine the substance within the length of the cutting elements during the operation of stripping it from the intestines as they are passed through the machine.

Normally, the lowermost or primary feeding rollers are spaced a predetermined distance apart, according to the thickness of the casings to be passed through the machine. The distance between the meeting circumferential faces 70' of the longitudinal ribs of said rollers 21 and 22 is determined by the thickness of the walls of the intestines. That is, figuring the average normal thickness of the wall membrane proper of the collapsed intestine tube and allowing some further space according to the thickness and density of the exterior substance to be removed from the tube. Likewise, the distance between the meeting apexes of the circumferential teeth of the stripping rolls 23 and 24 is about the same as the normal distance between the meeting circumferential faces 70' of the primary feeding rolls, as just hereinbefore set forth. By this adjustment, the intestines in passing between the rollers 21 and 22 have the fatty exterior substance compressed and correspondingly conformed according to the shape of the corrugations. That is to say, the intestines are compressed with sufficient biting effect to feed them in an upward direction and at the same time the exterior fatty substance is crimped transversely so as to present the fatty substance in a corrugated condition to the action of the spaced pair of opposed stripping rolls 23 and 24, which are geared to rotate at a considerably higher speed than the said feeding rollers 21 and 22, as will be hereinafter explained. The secondary feeding rollers 25 and 26 are normally set in closer relation to each other than the rollers 21 and 22, as the greater portion of the fatty external substance has been removed from the tube by the action of the stripping rolls 23 and 24, and the cutter elements 27 and 28, which rotate at a higher speed than the feeding rolls and in the reverse direction, as do the stripping rolls 23 and 24, are normally set in relation to each other so that the cutting edges of the blades 72 travel in sufficiently close relation to each other to remove practically all of the external matter on the surface without injury to the tube.

Should any portions of the tube be unduly enlarged either in the walls proper or due to excess of external substance thereon, in proportion to the normal spaced set of the respective feeding and defatting rolls, the respective rolls that are provided with the springs 53 will yield to permit the said thickened portion of the tube to pass between that particular pair of rolls, but should the limited opening beween that particular pair of rolls not be sufficient to permit passage of the material between them, the treadle spring 68 will yield and permit the plate 47, carrying all of the yieldable feeding rollers and defatting rolls, to move away from the stationary elements.

The gearing for driving the several rolls will now be described. The stripping rolls 23 and 24 and cutters 27 and 28, being necessarily operated at a relatively high speed, are geared directly to the driving shaft 74 of the motor 16, this being accomplished by carrying a chain 75 about a sprocket wheel 76 located on said shaft 74, and a corresponding sprocket wheel 77 on the drive shaft 27' of the rotary cutting element 27, while the shaft 23', on which the stripping roll 23 is mounted, is provided with a sprocket wheel 78 which is connected by a chain 79 to a sprocket wheel 80 on said shaft 27'. The driving shaft 74 is provided with a pinion 81, which is in mesh with a larger gear 82 on a counter shaft 83, said counter shaft having a sprocket wheel 84 thereon, said sprocket wheel being connected by a chain 85 to a sprocket wheel 86, of larger diameter, which is fixed on the shaft 25' of the secondary feeding roller 25. The feeding roller shaft 25' is provided with a second sprocket wheel 87, which is connected to a similar sprocket wheel 88 on the driving shaft 29' for the feeding roller 29, by a chain 89. Said shaft 25' is provided with a third sprocket wheel 90, which is connected by a chain 91 to sprocket wheel 92 on the shaft 21' for the primary feeding roller 21.

The shaft 27' is provided with a spur gear 93, which meshes with a corresponding gear 94 on the shaft 28' which carries the cutter element 28, said spur gears 93 and 94 having relatively long teeth which will permit of variation in the distance between the axes of the two shafts 27' and 28' and not interfere with the proper working relation of the two gears which are constantly in mesh. The shaft 28' is provided with a sprocket wheel 95, which corresponds to the sprocket wheel 80 on the shaft 27', and it is connected by a chain 96 to a sprocket wheel 97 on the shaft 24' which carries the stripping roll 24. By this arrangement the stripping rolls 23 and 24 and cutter elements 27 and 28 are positively driven at the same speed and said members are rotated in a direction so that their peripheral portions will travel oppositely to the direction in which the tube to be treated is fed between them.

The shaft 21' is provided with a spur gear 98, which meshes with a corresponding gear 99 on the shaft 22', which carries the feeding roller 22, the teeth of these two gears 98 and 99 also being of such length that said shaft 22' is permitted to swing with respect to the shaft 21'. The shaft 22' is provided with a sprocket wheel 100, which is connected by a chain 101 to a sprocket wheel 102 provided on the shaft 26', which carries the secondary feeding roller 26. The shaft 26' is also provided with a sprocket wheel 103, which is connected by a chain 104 to a sprocket wheel 105 mounted on the shaft 30', which carries the feeding roller 30. By this arrangement the respective feeding rollers are driven simultaneously and at the same speed, and in a direction to feed the tube to be treated upwardly between the respective pairs of rollers. After the defatted tube is passed between the uppermost pair of rollers 29 and 30, it may be placed in a container or otherwise disposed of for future use, but, preferably, the machine is provided with a reel 106 having clips or hooks 107 to which the end of the tube may be attached, said reel comprising a circular body portion from which projects a series of fingers 108 which afford the support for the tube as it is wound thereon. The reel is mounted on a shaft 109 journaled in an extension of the main frame of the machine, said shaft having a sprocket wheel 110 which is connected by a chain 111 to a sprocket wheel 112 on the shaft 21', said sprocket wheels 110 and 112 being relatively proportioned so that the reel 106 rotates at a speed corresponding to that of the feed rollers. In other words, the peripheral travel of said reel is at the same speed as that at which the tube being treated travels between said feed rollers.

Before subjecting the intestinal tubes to the action of the rotary feeding and defatting elements, just hereinbefore described, they are preferably passed between squeezer rollers 113 and 114, which are mounted in an extension of the body frame 15, said roller 113 being stationarily supported on the frame and the cooperating upper roller 114 being vertically movable and yieldably held in working relation to said roller 113 by a spring 115. The lower roller 113 is mounted on a shaft 116, and the upper roller 114 is mounted on a shaft 117, said shaft 117 being mounted at one end in a journal box 118, which latter is swiveled about a horizontal axis so as to permit raising and lowering of the outer end portion of the shaft 117, on which is mounted the roller 114. On the shaft 116 is a sprocket wheel 119, which is connected by a chain 120 to a pinion 121 on the shaft 21'. By this arrangement the shaft 116 is positively driven, and as the vertically movable roller 114, due to its own weight, which is augmented by the pressure of the spring 115, bears upon the intestinal tube passing between the two rollers, the matter in the interior of the tube is squeezed from between the compressed walls thereof, and also a certain amount of the softer matter is removed from the exterior of the tube.

To secure a better result in the treatment of the intestinal tubes, they are preferably subjected to the action of hot water, which is sprayed upon them from horizontally disposed perforated pipes 122 which, as shown, are located above the upper roller 114, said pipes 122 being lateral extensions of branches 123 at the end of the depending portion 124 of a branch pipe 125 leading from the supply pipe 126. Said supply pipe 126 is extended downwardly between the shafts of the respective feed rollers and rotary stripping and cutting elements, said downward extension 127 having laterally extending branches 128 which are provided with apertured extensions 129, whereby to supply hot water upon the intestinal tube as it passes between the feeding and treating rolls. In practice, a drip pan 130 is placed beneath the vertical column of feeding rollers and rotary elements, as shown in Fig. 5 of the drawings, into which the grease-laden water is received and thence conducted to a suitable device or place of separation (not shown), whereby the fatty substance is recovered for useful purposes. Obviously, a separate pan may be placed under the squeezer rollers 113 and 114 so as to salvage whatever useful matter is removed at this stage of the treatment of the tubes.

In passing the intestinal tube through the machine it is gripped rather tightly by the corrugated primary and secondary feeding rollers 21, 22 and 25, 26, and by the final feeding rollers 29 and 30, which are preferably covered by a fabric of the character of canvas, and thereby held taut. While traveling in this condition at a comparatively slow speed, the tube is acted upon first by the circumferentially toothed stripping rolls 23 and 24, the pointed pyramidal teeth of which are relatively deep so as to take care of a considerable body of fat on the exterior of the tube, said rollers being, of course, spaced a sufficient distance apart so that the pointed ends of the teeth will not dig into or mutilate the tube itself. The substance which is not stripped and shredded from the tube by the rolls 23 and 24 is removed by the rotary cutters 27 and 28 as the tube passes between the secondary feeding rollers 25 and 26 and the final feeding rollers 29 and 30, said rotary cutting elements 27 and 28 having spiral ribs 131, on the rear faces of which are placed the cutting blades 72, said blades being riveted to said ribs, as at 133, and their cutting edge portions 134 projecting beyond the circumferential faces 135 of said ribs 131 a distance approximately equal to the average thickness of the external substance to be removed from the tube. The cutting elements are spaced apart so that the meeting circumferential faces 135 of the ribs 131 will engage the fatty substance just before the cutting blades act upon it, but without compressing said substance. That is to say, the circumferential portions 135 of the ribs 131 merely contact with the external fatty substance sufficiently to support it without appreciable compression just prior to the engagement therewith by the meeting cutting edges 135 of said blades 72, the space between which is approximately equal to the thickness of the walls proper of the collapsed tube. These blades rotating at a much higher speed and in the opposite direction to the feeding travel of the tube, and said blades being spirally arranged, they act upon the fatty substance with a shearing effect so as to neatly remove it from the tube.

In the operation of the machine, the intestine to be treated is conveniently inserted therein by the operator depressing the foot pedal 62, which causes the several movable feeding rollers and stripping and cutting elements to be moved apart from their companion rollers or elements, the intestine being clamped between the rollers when the operator releases said pedal 62. In initially inserting the intestine to be treated, a portion of the length from its end sufficient to reach between the primary feeding rollers 21, 22 and the final feeding rollers 29, 30, is placed downwardly between the respective cooperating pairs of feeding rollers and stripping and cutting elements, and after this portion has travelled upwardly and been acted upon by the several treating elements, it is again inserted, being disposed upwardly so that the remainder of the intestine is accordingly fed in an upward direction for treatment by the several elements. In this way the intestine is carried through the machine in a taut condition throughout its entire length while being subjected to the action of the several treating elements.

After the tubes have been defatted they are turned inside out and finally prepared in the customary manner for use as sausage casings.

Obviously, the machine may be modified considerably without in the least departing from the spirit and scope of the invention as defined by the appended claims. The invention, therefore, is not limited to the specific construction and arrangement shown in the accompanying drawings.

Having thus described our invention, what we claim as new and desire to secure by Letters Patent is:

1. In a machine of the character described, cooperating pairs of primary and secondary corrugated feeding rollers, a pair of stripping rollers interposed between said pairs of feeding rollers, said stripping rollers having circumferential pointed teeth, a pair of final feeding rollers in cooperative relation to the secondary feeding rollers, and a pair of rotary cutting elements interposed between said secondary and final feeding rollers, said cutting elements having longitudinally extending circumferential cutting blades acting in meeting relation with shearing effect.

2. In a machine of the character described, lineally spaced pairs of cooperatively opposed feeding rollers and interposed rotary stripping and cutting elements also arranged in cooperatively opposed pairs, companion rollers or elements of each pair being movable laterally relative to each other, means for simultaneously moving the respective rollers and elements of each pair apart, said means yieldably holding them in normal opposed cooperative relation, and independently yielding means permitting individual separation of the respective pairs of rollers and elements.

3. In a machine of the character described, cooperating pairs of primary and secondary feeding rollers, said rollers being circumferentially corrugated, the primary rollers being spaced normally a predetermined distance apart and said secondary rollers being normally in closer relation than said primary rollers, a pair of stripping rolls interposed between said primary and secondary rollers, said stripping rolls having circumferential teeth of pyramidal form and being spaced normally apart so that their pointed ends will not mutilate the tubing being treated between them, a pair of final feeding rollers normally in contact with each other, said rollers being fabric covered, a pair of rotary cutting elements interposed between said secondary and final feeding rolls, said rotary cutting elements having longitudinally extending blades whose cutting edge portions project beyond the circumferences of said elements and cooperate in meeting relation with shearing effect, said rotary cutting elements being spaced apart so that the cutting edges of their blades travel in close proximity to the opposite outer faces of the tube passed between them without mutilating the tube, means for rotating said feeding rollers in the same direction and at the same speed, and means for rotating said stripping and cutting elements at a greater peripheral speed and in a direction opposite to the feeding travel of the tube being passed between them for treatment.

4. In a machine of the character described, pairs of cooperatively opposed feeding rollers and rotary stripping and cutting elements, one roller or element of each pair being movable with respect to the other roller or element, means for yieldably holding said rollers and elements in normally closed relation, and means under control of the operator for collectively moving said movable rollers and elements apart at will.

5. In a machine of the character described, pairs of cooperatively opposed feeding rollers and rotary stripping and cutting elements, one roller or element of each pair being rotatable about a fixed axis, and the companion roller thereof being mounted to rotate about a laterally movable axis, means for yieldably holding said movably mounted rollers and elements in normal closed relation, means under the control of the operator for moving said movably mounted rollers and elements in series away from their respective companion rollers or elements at will, means for rotating said feeding rollers in a direction to feed a tube to be treated between them in a taut condition, and means for rotating the said stripping and cutting elements in a direction opposite to the travel of the tube being treated and at a greater peripheral speed than that of said feeding rollers.

6. In a machine of the character described, a series of cooperating feeding rollers and rotary stripping and cutting elements arranged in cooperatively opposed pairs and in vertical series, one roller or element of each pair being mounted on a fixed shaft and the companion roller or element being mounted on a laterally movable shaft on a correspondingly movable carriage, means acting upon said carriage for yieldably holding said pairs of rollers and elements in normal relation to each other, individual means for yieldably holding the rollers or elements of each pair in normal working relation, means under the control of the operator for actuating said carriage to move said cooperating pairs of rollers and elements apart in series, at will, means for simultaneously actuating said feeding rollers so as to move the tube to be treated upwardly between them in taut condition, and means for simultaneously rotating said stripping and cutting elements in a direction opposite to the travel of said tube and at a greater peripheral speed than that of said feeding rollers.

7. In a machine of the character described, a frame, a vertical series of shafts mounted in fixed bearings in said frame, a companion vertical series of shafts mounted in movable bearings in said frame, a cooperating pair of primary feeding rollers mounted on the lowermost shafts, said rollers being spaced a predetermined distance apart and having longitudinally corrugated circumferential portions, a pair of stripping rolls mounted on the next adjacent upper shafts, said stripping rolls having circumferential pyramidal teeth, a pair of secondary feeding rollers mounted on the shafts next above said stripping rolls, said secondary rollers being similar to said primary feeding rollers but being normally located closer together than said primary feeding rollers, a pair of rotary cutting elements mounted on the shafts next above said secondary feeding rollers, said cutting elements having longitudinally extending circumferential cutting blades and being spaced normally a predetermined distance apart, a pair of final feeding rollers mounted on the uppermost shafts, means for yieldably holding said pairs of feeding rollers and stripping and cutting rolls in normally closed working relation to each other, means under the control of the operator for simultaneously moving said feeding rollers and stripping and cutting rolls apart, at will, independent yieldable means permitting individual separation of the respective pairs of said feeding rollers and stripping and cutting rolls, means for simultaneously rotating all of said feeding rollers in one direction and at the same speed, and means for rotating said stripping and cutting elements simultaneously in the opposite direction and at a greater peripheral speed than that of said feeding rollers.

8. In a machine of the character described, a vertical series of fixed shafts, a companion series of vertical shafts journaled in bearings at one end which are swiveled about vertical axes, said second mentioned series of vertical shafts being journaled near their opposite ends in horizontally movable bearings, said bearings being mounted on a common horizontally movable support, means acting upon each individual horizontally movable bearing for yieldably holding said bearing in normal position, means for yieldably holding said horizontally movable bearing support in normal position, means controllable by the operator for moving said horizontally movable bearing support from its normal position, a pair of cooperating primary feeding rollers mounted on the lowermost pair of said shafts, said feeding rollers having longitudinal circumferential corrugations, a pair of stripping rolls mounted on the shafts next above said primary feeding rollers, said stripping rolls having circumferential pyramidal teeth, a pair of secondary feeding rollers mounted on the shafts next above said stripping rolls and being similar to said primary feeding rollers but being positioned in closer normal cooperative relation to each other, a pair of cutting rolls mounted on the shafts next above said secondary feeding rollers, said cutting rolls having longitudinally extending, substantially spiral, circumferential cutting blades and being spaced a predetermined distance apart, a pair of final feeding rollers mounted on the shafts next above said cutting rolls, said final feeding rollers being located normally in close relation to each other and having fabric covered circumference, means for simultaneously rotating all of the shafts on which said feeding rollers are mounted at the same speed, and means for rotating the shafts on which said stripping rolls and cutting rolls are mounted in the opposite direction and at a greater peripheral speed than said other shafts.

In testimony whereof we have signed our names to this specification.

IRVING W. ROSS.
JOSEPH S. KROB.